(12) United States Patent
Crouch et al.

(10) Patent No.: US 11,408,751 B2
(45) Date of Patent: Aug. 9, 2022

(54) SYSTEMS AND METHODS FOR CALIBRATING A SENSOR POSITION ON AN AIRCRAFT

(71) Applicant: HONEYWELL INTERNATIONAL INC., Charlotte, NC (US)

(72) Inventors: Steven Curtis Crouch, Phoenix, AZ (US); Sudarshan Parthasarathy, Bangalore (IN); Santosh Kumar Sahoo, Bangalore (IN); Jan Urbanec, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 128 days.

(21) Appl. No.: 17/034,277

(22) Filed: Sep. 28, 2020

(65) Prior Publication Data

US 2022/0042822 A1    Feb. 10, 2022

(30) Foreign Application Priority Data

Aug. 4, 2020    (IN) .............................. 202011033342

(51) Int. Cl.
*G01C 21/00*    (2006.01)
*G01S 19/47*    (2010.01)
(Continued)

(52) U.S. Cl.
CPC ......... *G01C 21/3844* (2020.08); *B64D 45/00* (2013.01); *B64F 5/40* (2017.01);
(Continued)

(58) Field of Classification Search
CPC .... G01C 21/3844; G01C 23/00; B64D 45/00; B64D 43/00; B64F 5/40; G01S 19/46;
(Continued)

(56) References Cited

U.S. PATENT DOCUMENTS 6,381,540 B1    4/2002    Beason et al.
8,924,046 B2    12/2014    Gerthoffert et al.
(Continued)

FOREIGN PATENT DOCUMENTS

EP    2244239 A2    10/2010
EP    2515078 A2    10/2012
(Continued)

*Primary Examiner* — Yuen Wong
(74) *Attorney, Agent, or Firm* — Lorenz & Kopf, LLP

(57) ABSTRACT

Methods and systems for calibrating aircraft position by providing touch-enabled selection of onboard sensors on an aircraft. The method includes receiving sensor map location information for onboard sensors including N position computers, a global positioning system (GPS) sensor, an inertial reference system (IRS) sensor, and a radio navigation (NAV) sensor; receiving sensor data from the onboard sensors, and configuring a user interface layout for the touch display unit presenting the onboard sensors using symbols at respective locations. Embodiments depict the sensors with intuitive symbols and provide a terrain layout in the background. The method includes interpreting a touch input from the touch-enabled display unit to select a position computer and an onboard sensor, and to calibrate the selected position computer with the selected onboard sensor and update the user interface layout to reflect the calibration, responsive to the touch input.

20 Claims, 10 Drawing Sheets

(51) Int. Cl.
  *B64D 45/00* (2006.01)
  *G08G 5/00* (2006.01)
  *B64F 5/40* (2017.01)
  *G01S 19/46* (2010.01)

(52) U.S. Cl.
  CPC .............. *G01S 19/46* (2013.01); *G01S 19/47* (2013.01); *G08G 5/0047* (2013.01)

(58) Field of Classification Search
  CPC .... G01S 19/47; G08G 5/0047; G08G 5/0021; G08G 5/0052; G06F 3/00
  See application file for complete search history.

(56) References Cited

U.S. PATENT DOCUMENTS

| | | |
|---|---|---|
| 9,384,586 B1 | 7/2016 | McCusker et al. |
| 9,678,102 B2 | 6/2017 | Ho et al. |
| 2016/0004374 A1 | 1/2016 | Kneuper et al. |
| 2017/0138759 A1* | 5/2017 | Turner ................. G08G 5/0021 |

FOREIGN PATENT DOCUMENTS

| | | |
|---|---|---|
| EP | 2990763 A1 | 3/2016 |
| JP | 2006064414 A | 3/2006 |

* cited by examiner

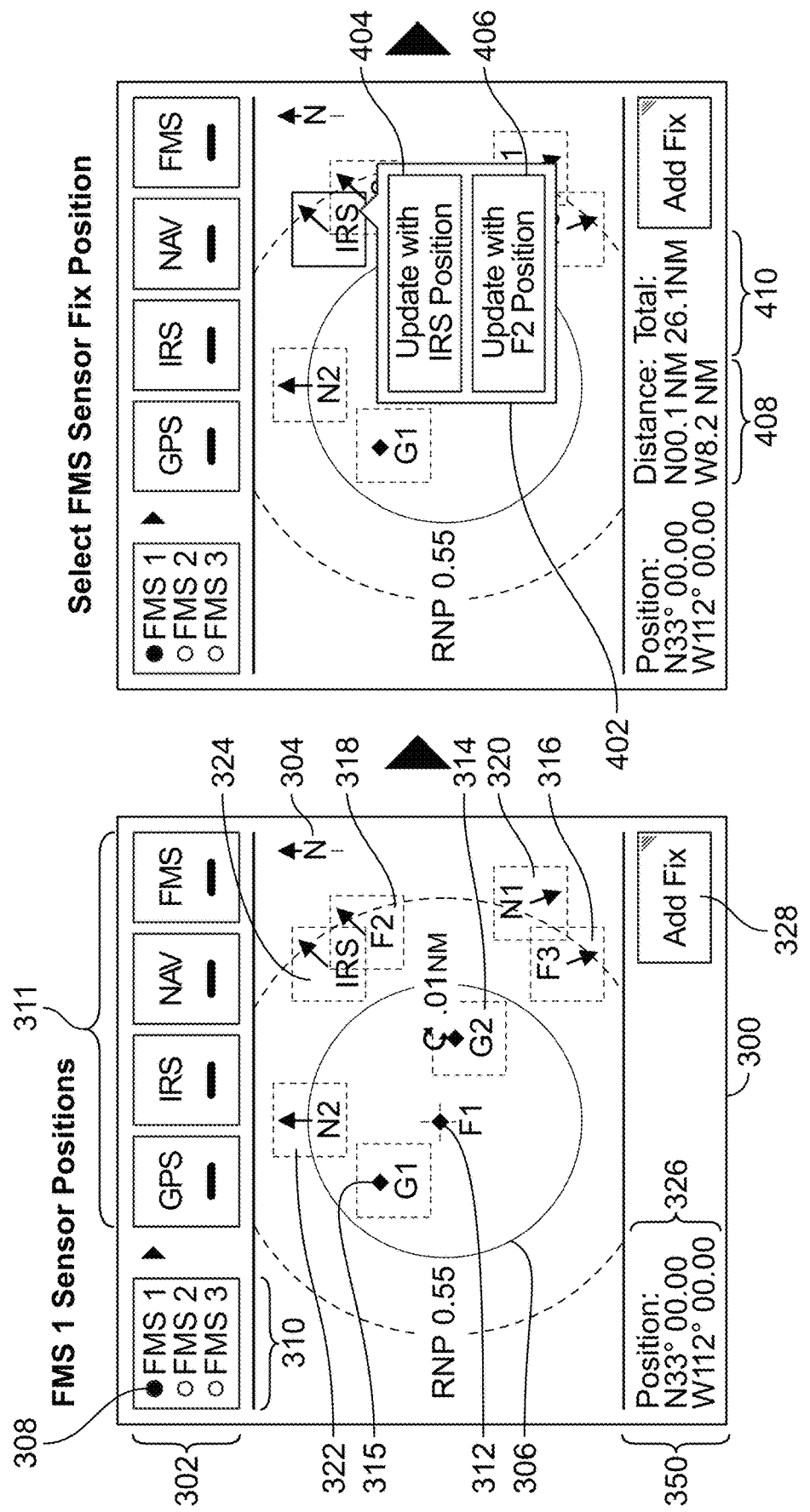

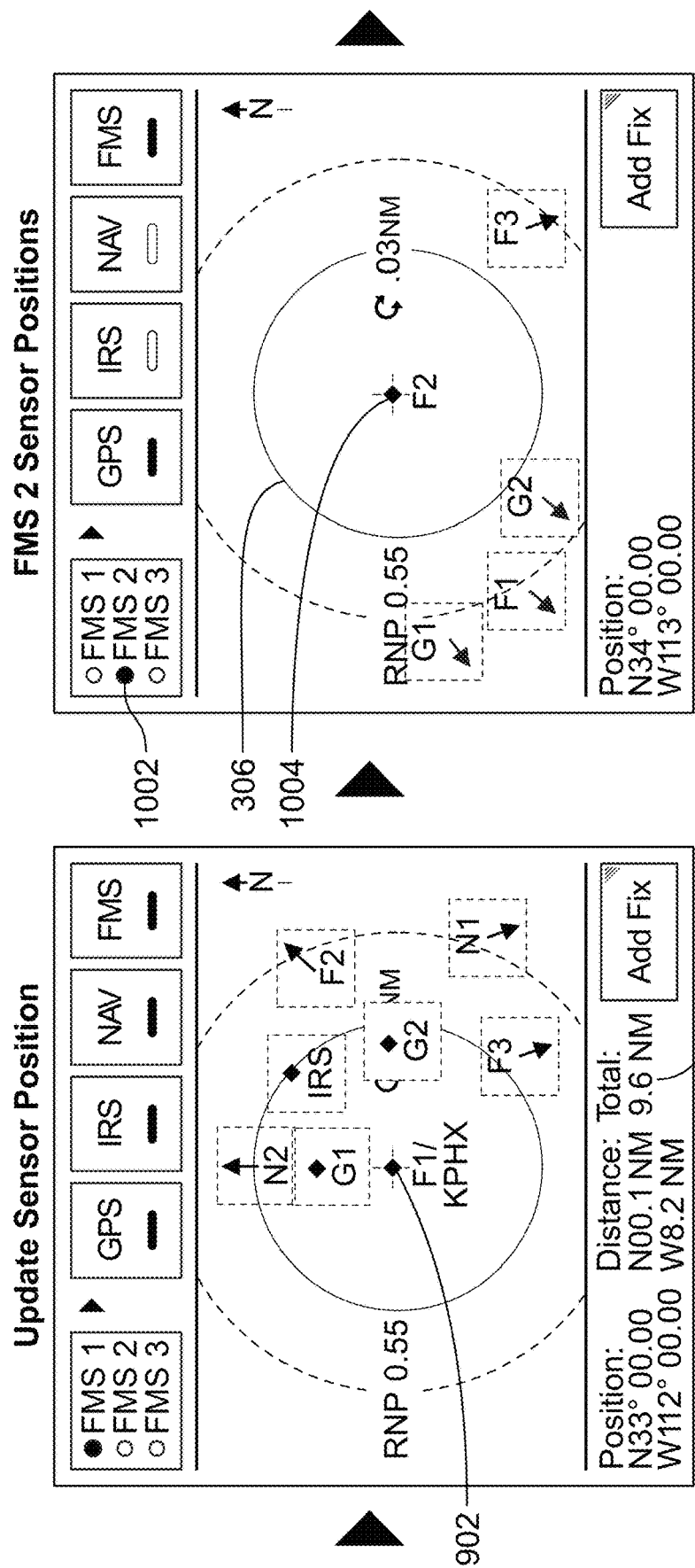

SYSTEMS AND METHODS FOR CALIBRATING A SENSOR POSITION ON AN AIRCRAFT

CROSS REFERENCE TO RELATED APPLICATION

This application claims priority to Indian Provisional Patent Application No. 202011033342, filed Aug. 4, 2020, the entire content of which is incorporated by reference herein.

TECHNICAL FIELD

The following disclosure relates generally to the selection of sensors on aircraft, and, more particularly, to systems and methods for calibrating aircraft position by providing touch-enabled selection of onboard sensors on an aircraft.

BACKGROUND

Modern complex avionics systems generally have a position computer that uses multiple redundant sensor systems to automatically compute an aircraft position. In some scenarios, the crew may desire to interact with this avionics system. In some scenarios, the crew may wish to calibrate the position computer by including or excluding individual sensors from this computation. In these scenarios, they generally must use a user input device and perform a series of operations, navigating back and forth between windows.

The windows that a crew has to navigate between may include a first window with a textual readout of sensor latitude and longitude position in a list format. Using this first window, a sensor position has to be mentally processed by the crew and translated to a relative sensor position with respect to current aircraft position and relative to other onboard sensors to be useful. In some scenarios, the crew may have access to a second window with a graphical representation of positions of onboard sensors relative to a voted, master aircraft position, however even using this window, interacting with the system can be very cumbersome and does not provide a pilot with the ability to see potential data changes reflected in real time as sensor selections are made.

Accordingly, technologically improved systems and methods for calibrating aircraft position by providing touch-enabled selection of onboard sensors on an aircraft that provide a direct and intuitive, touch-based solution for selection of sensors and provide immediate visual feedback are desirable. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system for calibrating aircraft position by providing touch-enabled selection of onboard sensors on an aircraft having a touch-enabled display unit, the system includes: a number N of position computers, N being greater than or equal to 1; a plurality of onboard sensors for providing respective sensor data, the onboard sensors including a global position system (GPS) sensor, an inertial reference system (IRS) sensor, a radio navigation (NAV) sensor, and, for each of the N Position computers, a respective FMS sensor; a controller circuit comprising a processor configured to execute programming instructions stored in a memory, that when executed by the processor cause the controller circuit to: receive sensor map location information for the onboard sensors; receive sensor data from the onboard sensors; configure a user interface layout for the touch-enabled display unit based on the sensor map location information and the sensor data, the user interface layout presenting the N Position computers, the GPS sensor, the IRS sensor, the NAV sensor, and the N FMS sensors, using symbols at respective locations; render the user interface layout on the touch-enabled display unit; interpret a touch input from the touch-enabled display unit to select a position computer and to select an onboard sensor; calibrate the selected Position computer with the selected onboard sensor responsive to the touch input; modify the user interface layout to reflect the calibration; and modify a displayed range ring on the user interface layout responsive to the calibration.

Also provided is a processor-implemented method for calibrating an aircraft position on an aircraft having a touch-enabled display unit. The method includes: receiving sensor map location information for onboard sensors, the onboard sensors including N flight management system (FMS) computers, a geospatial positioning system (GPS) sensor, an instrument radar system (IRS) sensor, a navigation (NAV) sensor, and N FMS sensors; receiving sensor data from the onboard sensors; configuring a user interface layout for the touch-enabled display unit based on the sensor map location information and the sensor data, the user interface layout presenting the N Position computers, the GPS sensor, the IRS sensor, the NAV sensor, and the N FMS sensors, using symbols at respective locations; rendering the user interface layout on the touch-enabled display unit; interpreting a touch input from the touch-enabled display unit to select an Position computer and to select an onboard sensor; calibrating the selected Position computer with the selected onboard sensor responsive to the touch input; modifying the user interface layout to reflect the calibration; and modifying a displayed range ring on the user interface layout responsive to the calibration.

In another embodiment, a system for calibrating an aircraft position is provided. The system includes: a configuration module operating onboard the aircraft and configured to receive ownship data from ownship data sources including sensor data from a plurality of onboard sensors. Non-limiting examples of the onboard sensors include a global position system (GPS) sensor, an inertial reference system (IRS) sensor, and, a radio navigation (NAV) sensor, and reference sensor map location information for the onboard sensors to generate therefrom a user interface layout for a touch-enabled display; a user input interpretation module operating on the aircraft and configured to process user input at the touch-enabled display with respect to the user interface layout to: determine when a user has selected an Position computer; and determine when the user has selected an onboard sensor; and a calibration module operating on the aircraft and configured to calibrate the selected Position computer with the selected onboard sensor; and a layout modification module operating on the aircraft and operating to determine which aspects of the user interface layout to modify and modify the user interface accordingly, responsive to the calibration of the Position computer with the selected onboard sensor.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and:

FIGS. 3-14 depict various presentations of information on a graphical user interface layout for a touch display unit, in accordance with an exemplary embodiment of the present disclosure.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described aircraft system.

As mentioned, in modern avionics systems, generally a position computer uses multiple redundant sensor systems to automatically compute an aircraft position. In scenarios, the crew desires to calibrate the position computer by including or excluding individual sensors from this computation. In these scenarios, they generally must use a user input device and perform a series of operations, navigating back and forth between windows. The human-machine interface that they must interact with for this calibration generally includes a user input device, such as a keyboard, and a separate display device, and the human-machine interaction includes a series of cumbersome operations, navigating back and forth between windows, during which time the human-machine interface is not providing a pilot with the ability to see potential data changes reflected in real time as sensor selections are made.

The embodiments described herein deliver technologically improved systems and methods for calibrating a sensor position on an aircraft having a touch-enabled display unit. Embodiments provide a direct and intuitive, touch-based solution for selection of sensors (or other external references) with immediate visual feedback, including immediate sensor data position updates, in a What You See Is What You Get (WYSIWYG) presentation style. Specifically, embodiments provide a visual depiction of individual position sensors distributed such that their position on a lateral display represents their position relative to the position of the aircraft. Other words, it is like having a map with a position of own ship and position of individual sensors. Accordingly, the described embodiments deliver an objectively improved human-machine interface during sensor calibration that reduces cognitive load for the flight crew.

Figure 1:
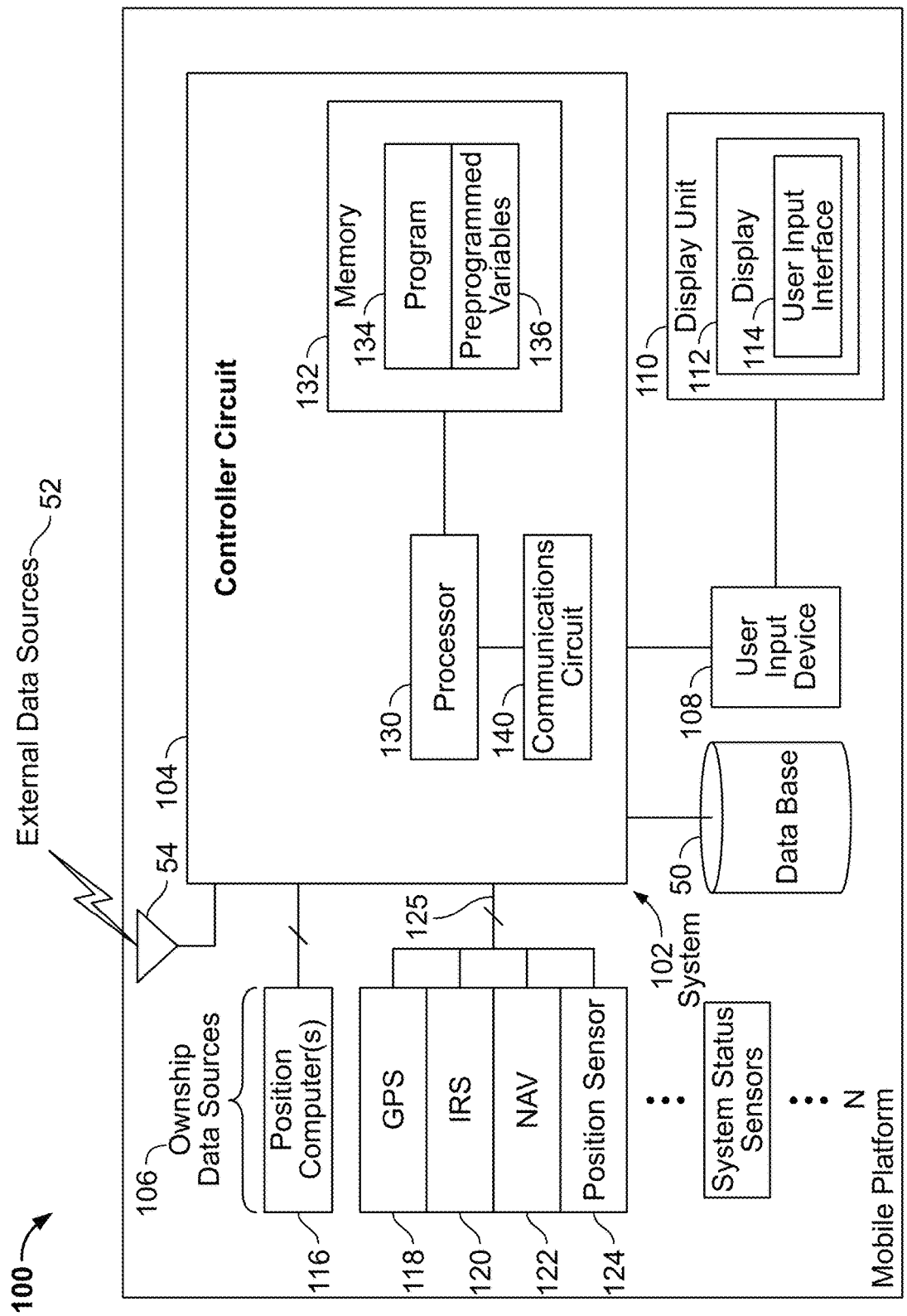
FIG. 1 is a block diagram of a system for calibrating an aircraft position by providing touch-enabled selection of onboard sensors on an aircraft, as illustrated in accordance with an exemplary embodiment of the present disclosure.

FIG. 1 is a block diagram of a system 102 for calibrating a sensor position on an aircraft having a touch-enabled display unit, as illustrated in accordance with an exemplary and non-limiting embodiment of the present disclosure. The system 102 for computing an aircraft position by providing touch-enabled selection of onboard sensors (118, 120, 122, 124 may be utilized onboard a mobile platform 100 to provide an aircraft position (shortened herein to "system" 102), as described herein. In various embodiments, the mobile platform is an aircraft 100, which carries or is equipped with the system 102. As schematically depicted in FIG. 1, system 102 includes the following components or subsystems, each of which may assume the form of a single device or multiple interconnected devices: a controller circuit 104 operationally coupled to: at least one display device 110; computer-readable storage media or memory 132; an optional input interface 114, and ownship data sources 106. The system 102 may be separate from or integrated within: a flight management system (FMS) and/or a flight control system (FCS). The system 102 may also contain a datalink subsystem including an antenna 54, which may wirelessly transmit data to and receive real-time data and signals from various external sources (52), including, each of: traffic, air traffic control (ATC), weather systems, ground stations, and the like.

Although schematically illustrated in FIG. 1 as a single unit, the individual elements and components of the system 102 can be implemented in a distributed manner utilizing any practical number of physically distinct and operatively interconnected pieces of hardware or equipment. When the system 102 is utilized as described herein, the various components of the system 102 will typically all be located onboard the Aircraft 100.

The terms "controller circuit," and "module," as appearing herein, broadly encompass those components utilized to carry-out or otherwise support the processing functionalities of the system 102. Accordingly, controller circuit 104 and modules of FIG. 2 can encompass or may be associated with a programmable logic array, application specific integrated circuit or other similar firmware, as well as any number of individual processors, flight control computers, navigational equipment pieces, computer-readable memories (including or in addition to memory 132), power supplies, storage devices, interface cards, and other standardized components. In various embodiments, controller circuit 104 embodies one or more processors operationally coupled to data storage having stored therein at least one firmware or software program (generally, computer-readable instructions that embody an algorithm) for carrying-out the various process tasks, calculations, and control/display functions described herein. During operation, the controller circuit 104 may be programmed with and execute the at least one firmware or software program, for example, program 134 with preprogrammed variables 136, that embodies an algorithm for calibrating a sensor position on an aircraft having a touch-enabled display unit, to thereby perform the various process steps, tasks, calculations, and control/display functions described herein.

In various embodiments, the controller circuit 104 may utilize a communications circuit 140 to exchange data, including real-time wireless data, with one or more external sources 52 to support operation of the system 102. In various embodiments, the communications circuit 140 manages bidirectional wireless data exchange over a communications network, such as a public or private network implemented in accordance with one or more communication protocols. An example communication protocol is a Transmission Control Protocol/Internet Protocol architectures or other conventional protocol standards. In various embodiments, the communications circuit 140 manages encryption and mutual authentication techniques, as appropriate, to ensure data security.

Memory 132 is a data storage that can encompass any number and type of storage media suitable for storing computer-readable code or instructions, such as the aforementioned software program 134, as well as other data generally supporting the operation of the system 102. Memory 132 may also store preprogrammed variables, such as one or more threshold values, for use by an algorithm embodied in software program 134. Various embodiments also employ one or more database(s) 50, another form of storage media that may be integrated with memory 132 or separate from it.

In various embodiments, aircraft-specific parameters and information for aircraft 100 may be stored in the memory 132 or in a database 50 and referenced by the program 134. Non-limiting examples of aircraft-specific information includes sensor map location information for all available onboard sensors, and the like. As used herein, the sensor map location information includes, for each available onboard sensor used for navigation, a sensor category and sensor location.

In various embodiments, a symbol library (described in connection with FIG. 13) might be predefined and stored in the database 50 or in the memory 132.

In various embodiments, two- or three-dimensional terrain and map data may be stored in a database 50, including airport features data, geographical (terrain), buildings, bridges, and other structures, street maps, and navigational databases, which may be updated on a periodic or iterative basis to ensure data timeliness. This map data may be uploaded into the database 50 at an initialization step and then periodically updated, as directed by either a program 134 update or by an externally triggered update.

Ownship data sources 106 may include system status sensors and one or more position computers 116. In various embodiments, the position computers 116 are referred to as Flight Management System (FMS) computers 116 or navigators. Ownship data sources 106 also include various onboard sensors used for navigation, and can be categorized. Non-limiting examples of the onboard sensor categories include Global Position System (GPS) sensors 118, Inertial Reference System (IRS) sensors 120, radio Navigation (NAV) sensors 122, position sensors 124, and any other of a plurality of other position sensors. There may be more than one onboard sensor in each category. The position sensor or FMS sensor category, is actually a derived sensor category: In practice, the position computer/FMS 116 performs an algorithm which, for each position computer/FMS 116, calculates a blended position using other available sensors, such as IRS, GPS, Radio navigation (NAV) etc., considering their integrity and quality, therefore, these sensors may also be referred to herein as a blended position sensor/FMS sensor. Therefore, there is a one to one correspondence of position computers/FMSs 116 to position sensor/FMS sensors 124. Sensor data provided by the onboard sensors used for navigation may include location and direction/orientation information.

Collectively, ownship data sources 106 supply various types of data or measurements to controller circuit 104 during aircraft flight. In various embodiments, the ownship data sources 106 include onboard systems, onboard status sensors, and onboard inertial sensors. Accordingly, ownship data sources 106 collectively supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight track data, radar altitude data, and geometric altitude data.

In certain embodiments of system 102, the controller circuit 104 and the other components of the system 102 may be integrated within or cooperate with any number and type of systems commonly deployed onboard an aircraft including, for example, a position sensor/FMS 116, an Attitude Heading Reference System (AHRS), and/or an Inertial Reference System (IRS).

With continued reference to FIG. 1, display device 110 can include any number and type of image generating devices on which one or more avionic displays 112 may be produced. When the system 102 is utilized for a manned aircraft, display device 110 may be affixed to the static structure of the aircraft cockpit as, for example, a Head Down Display (HDD) or Head Up Display (HUD) unit. Alternatively, display device 110 may assume the form of a movable display device (e.g., a pilot-worn display device) or a portable display device, such as an Electronic Flight Bag (EFB), a laptop, or a tablet computer carried into the aircraft cockpit by a pilot.

At least one avionic display 112 is generated on display device 110 during operation of the system 102; the term "avionic display" defined as synonymous with the term "aircraft-related display" and "cockpit display" and encompasses displays generated in textual, graphical, cartographical, and other formats. The system 102 can generate various types of lateral and vertical avionic displays 112 on which map views and symbology, text annunciations, and other graphics pertaining to flight planning are presented for a pilot to view. The display device 110 is configured to continuously render at least a lateral display 112 showing the aircraft 100 at its current location within the map data.

The avionic display 112 generated and controlled by the system 102 can include a user input interface 114, including graphical user interface (GUI) objects and alphanumerical input displays of the type commonly presented on the screens of MCDUs, as well as Control Display Units (CDUs) generally. Specifically, embodiments of avionic displays 112 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface is implemented as an integration of the user input interface 114 and a touch-enabled display device 110, for example, a touch screen display device. In some embodiments, the human-machine interface includes an integration of the user input interface 114, a display device 110, and a user input device 108, such as a keyboard, or cursor control device. Embodiments of the controller circuit 104 employ various display and graphics systems processes to configure and render a specific user interface layout (FIG. 2, 203) and command and control the display device 110 to render the user interface layout thereon. The user interface layout 203 may include graphical user interface (GUI) objects or elements described herein, including, for example, touch-sensitive labels, symbols, buttons, sliders, and the like, which are used to prompt a user to interact. Accordingly, the human-machine interface of the present invention provides user input, activates respective functions, and provides user feedback, responsive to received user touch screen input.

Figure 2:
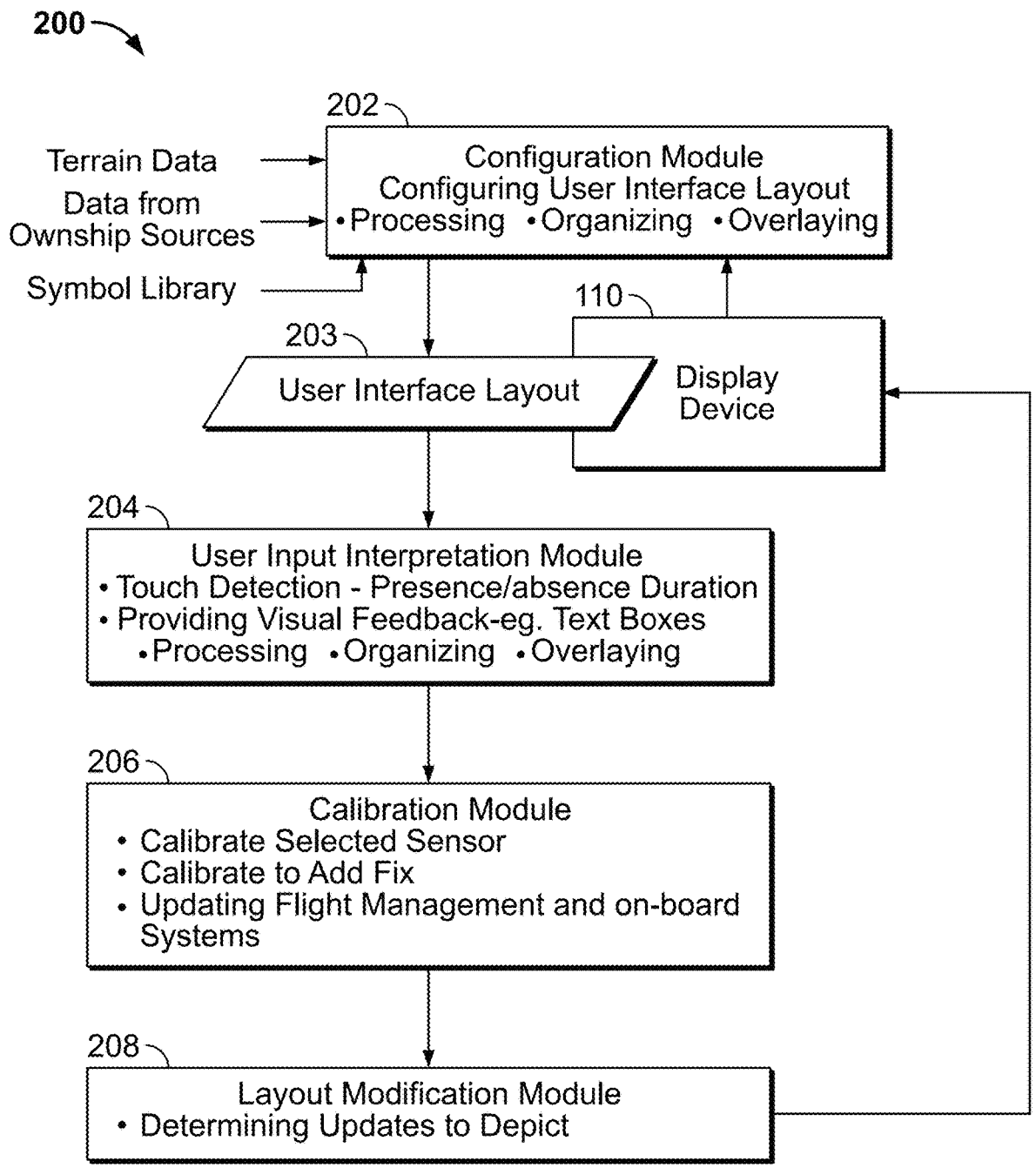
FIG. 2 is an architectural block diagram of one or more process modules in the system for calibrating an aircraft position by providing touch-enabled selection of onboard sensors on an aircraft, in accordance with an exemplary embodiment of the present disclosure.

Turning now to FIG. 2, and with continued reference to FIG. 1, various embodiments of the system 102 may comprise one or more process modules, such as those shown in the architectural block diagram 200. A configuration module 202 may direct the steps of processing input from the ownship data sources 106 and organizing the data into an avionic display 112; this includes creating the user interface layout 203 for the user input interface 114, to have the position computers and onboard sensors used for navigation represented at their respective locations, overlaid on a lateral avionic display and sized to be compatible with the available display device 110. The configuration module 202 may configure a user interface layout 203 for a touch display unit based on the sensor map location information and the sensor data, the user interface layout 203 presenting the N FMS computers, the GPS sensor, the IRS sensor, the radio NAV sensor, and the N FMS sensors, using symbols at respective locations.

Figure 13:
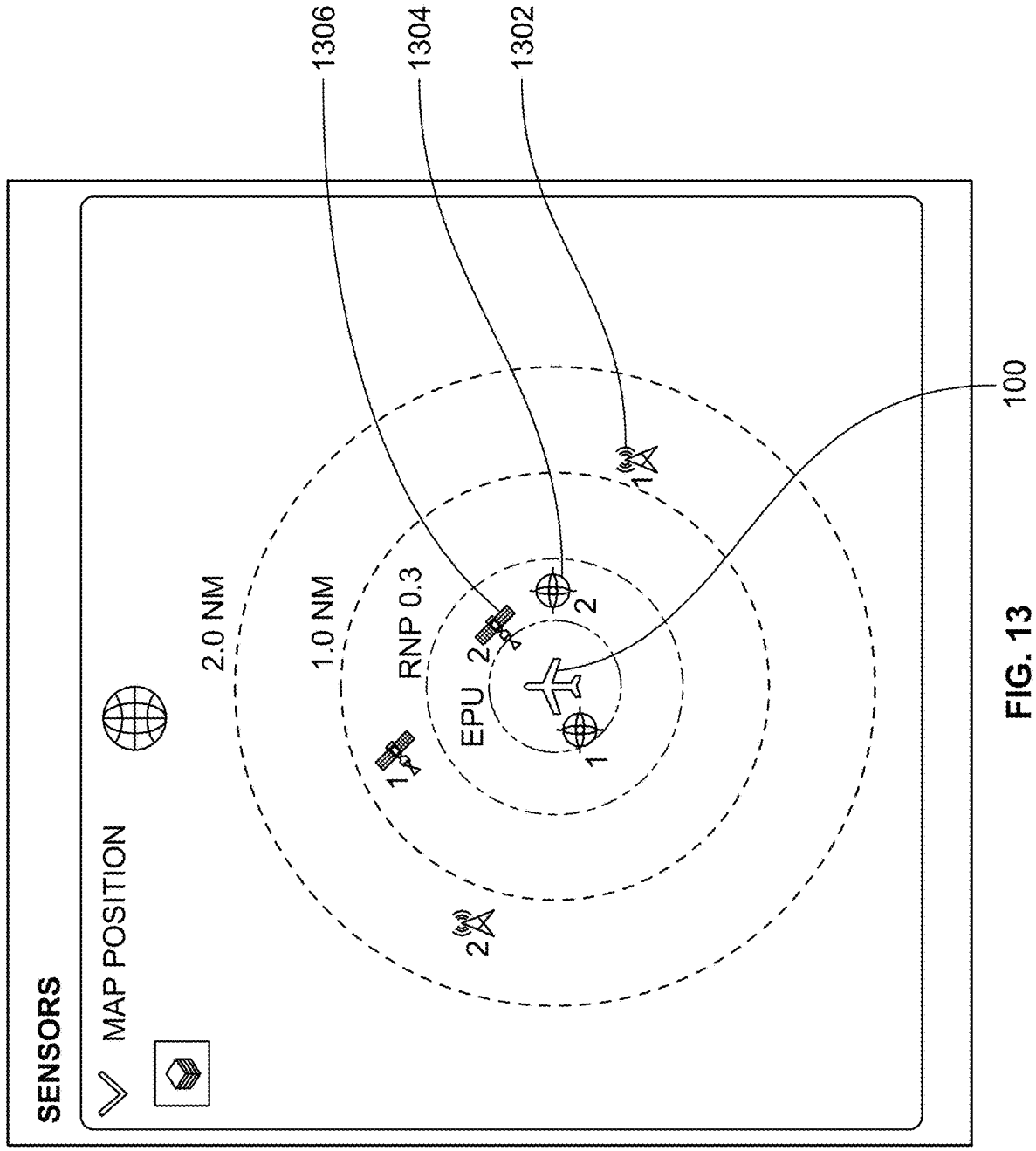
Figure 14:
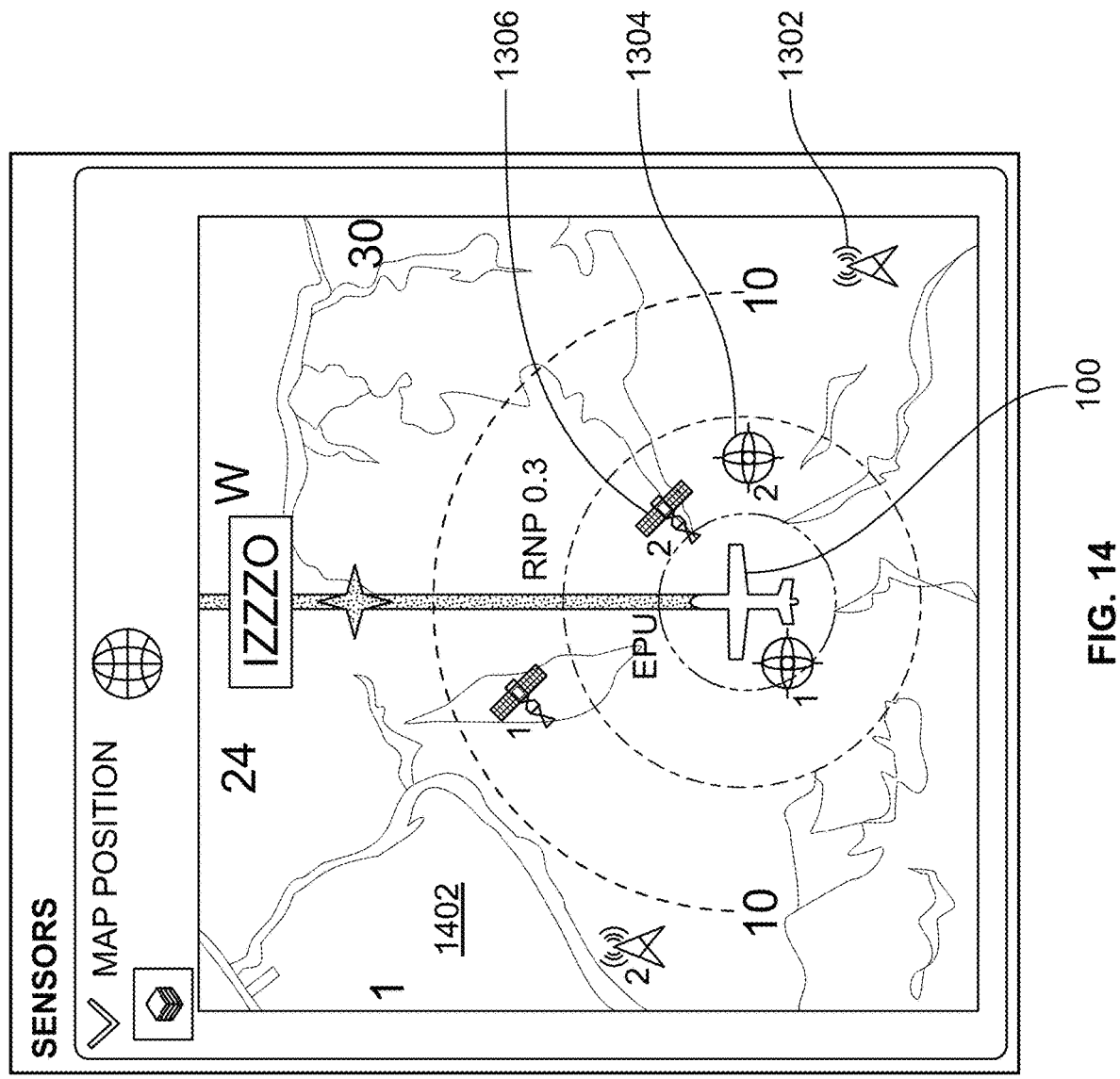

In embodiments that display terrain data, the configuration module 202 may receive the terrain data and render a terrain layer in the background of the user interface layout rendered on the touch-enabled display unit. In embodiments that utilize specific symbols for the various onboard sensors, the configuration module 202 may reference a predefined and stored symbol library and use a first symbol to indicate each global position system (GPS) sensor, a second symbol to represent each inertial reference system (IRS) sensors, and a third symbol to indicate each radio navigation (NAV) sensors; in these embodiments, any blended position sensors on the user interface layout 203 may be indicated with an alphanumeric label, or fourth symbol. The system 102 assures that the first, second, third and fourth symbols are visually distinguishable from each other; in an example, the first symbol, second symbol, third symbol, and fourth symbol include an antenna, a satellite, and a gyroscope, as shown in FIGS. 13 and 14. In various embodiments, the symbol selected to represent an onboard sensor is picked such that it intuitively represents a sensor type so that the pilot can recognize it without having to read text.

The system 102 renders the user interface layout on the display device 110. In various embodiments, the display device 110 is a touch screen display device or touch-enabled display device.

A user input interpretation module 204 may direct various processes of touch detection with respect to the display device 110. Initially, a touch may be detected in the area 310 for displaying available position computers/FMSs, and the selected FMS is indicated therein. In a first aspect, touch detection may include determining a presence/absence of a finger touch at a location on the user interface layout 203. In a second aspect, touch detection includes detecting a continuous touch of at least a first duration of time at an indicator of the onboard sensor on the user interface layout 203. Additionally, touch detection may include: displaying an alphanumeric message to update the selected FMS computer with the onboard sensor upon detection of the touch input; and, determining that the onboard sensor has been selected upon meeting the conditions (i) an expiration of the first duration of time with continuous touch, (ii) followed by the touch ceasing.

Figure 6:
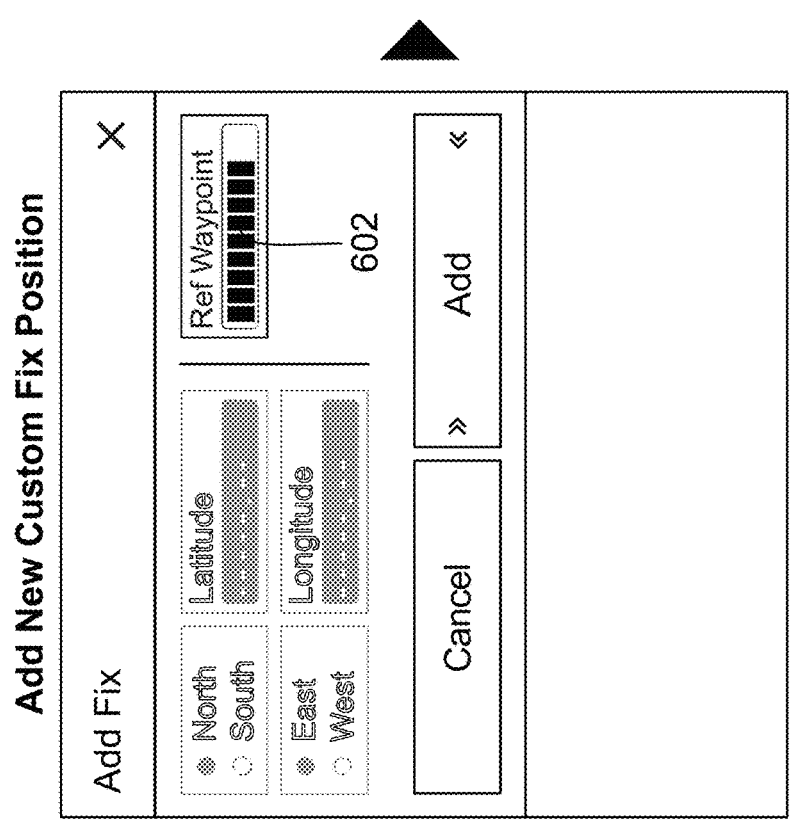

A mapped location of a detected touch may be compared to a predefined sensor assignment or other functional meaning on the user interface layout 203, as an aspect of user input interpretation. In embodiments that support an "add fix" feature, the user input interpretation module 204 detects that the add fix button has been touch selected, receives additional alphanumeric input at a designated area for the fix (such as is shown in FIG. 6, area 602), and determines when a user has selected the fix to correlate with the position computer/FMS. The user input interpretation module 204 may interpret touch input from the touch display unit 110 to select an onboard sensor. Output from the user input interpretation module 204 may include a selected position computer/FMS and a selected onboard sensor for calibration. In an embodiment, the output from the user input interpretation module 204 may include a selected position computer/FMS and a fix, or waypoint or other location entered as an "add fix."

The output from the user input interpretation module 204 is received by the calibration module 206; the calibration module 206 operates by calibrating the selected position computer/FMS computer according the user input, e.g., with the selected onboard sensor responsive to the touch input. Said differently, the calibration module 206 operates by providing a position solution, i.e., by calibrating the position computer/FMS by including or excluding individual sensors per the interpreted user's input. The calibration process can finalize by updating a position computer/FMS and on-board systems with the position solution.

A layout modification module 208 may receive, as input, the updated flight management and/or on-board systems information, determine therefrom which updates to depict on the user interface layout 203, and provide this input into the display device 110, thereby modifying the user interface layout 203 to reflect the calibration. The layout modification module 208 may also modify a displayed range ring on the user interface layout 203, responsive to the calibration.

Turning now to FIGS. 3-12, illustrations of the human-machine interface enabled by the user interface layout 203 in various use cases are provided, showing how the technical problem of calibrating the sensor position for an aircraft is objectively improved by the system 102 over available options. In the example embodiments shown in FIGS. 3-12, the system 102 provides a lateral map avionics display 300 in a dedicated area, overlaid with a selection band 302 along the top, and a band along the bottom 350 for additional text and graphical objects. In other embodiments, the location of the selection band and location of the bottom 350 band can differ, so long as their functionality is still provided. A compass indicator 304 is included for visual orientation, and one or more range-rings, such as the depicted 20 nautical mile range ring 306 may be rendered thereon.

An area 310 on the selection band 302 lists available position computers/FMSs. A remaining area 311 lists onboard sensor categories. In the example, area 310 lists FMS 1, FMS 2 and FMS 3, indicating three position computers or FMSs. Various embodiments include a plurality of onboard sensors for providing respective sensor data, the onboard sensors including a global position system (GPS) sensor, an inertial reference system (IRS) sensor, a radio navigation (NAV) sensor, and, for each of the N FMS computers, a respective FMS sensor (the blended sensors). The system 102 indicates the blended position sensor associated with a selected position computer at a center of the dedicated area and indicates a location of each of the onboard sensors used for navigation in the dedicated area by rendering a respective alphanumeric label and a symbol.

In the example of FIG. 3, FMS 1 is shown selected at 308, and a corresponding blended position computer sensor is indicated with F1 (312) is shown in the center of the range ring 306. A GPS 1 (314) sensor and GPS 2 (314) sensor position are depicted, as are blended position F2 (318), F3 (316), and the positions of radio navigation sensor N1 (320), radio navigation sensor N2 (322), and an IRS sensor (324). Alphanumeric labels are used for onboard sensors in this embodiment. An alphanumeric position 326 is provided for the selected FMS 1 308. An add fix button is rendered at 328. An observer may also note that a diamond symbol is used to indicate position sensors that are on-board (F1, G1, and G2), while an arrow symbol is used to depict position sensors that are off-board; the arrow points in the direction of the sensor location. For example, position sensor N1 (320) points down and to the right, which, based on the compass indicator 304, is south by southeast.

Figure 5:
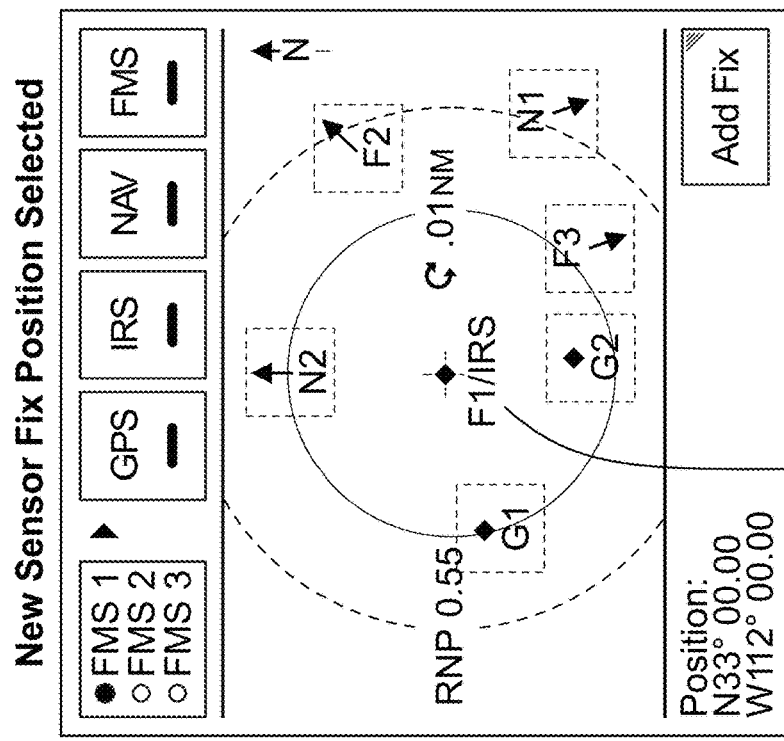
Figures 7, 8:
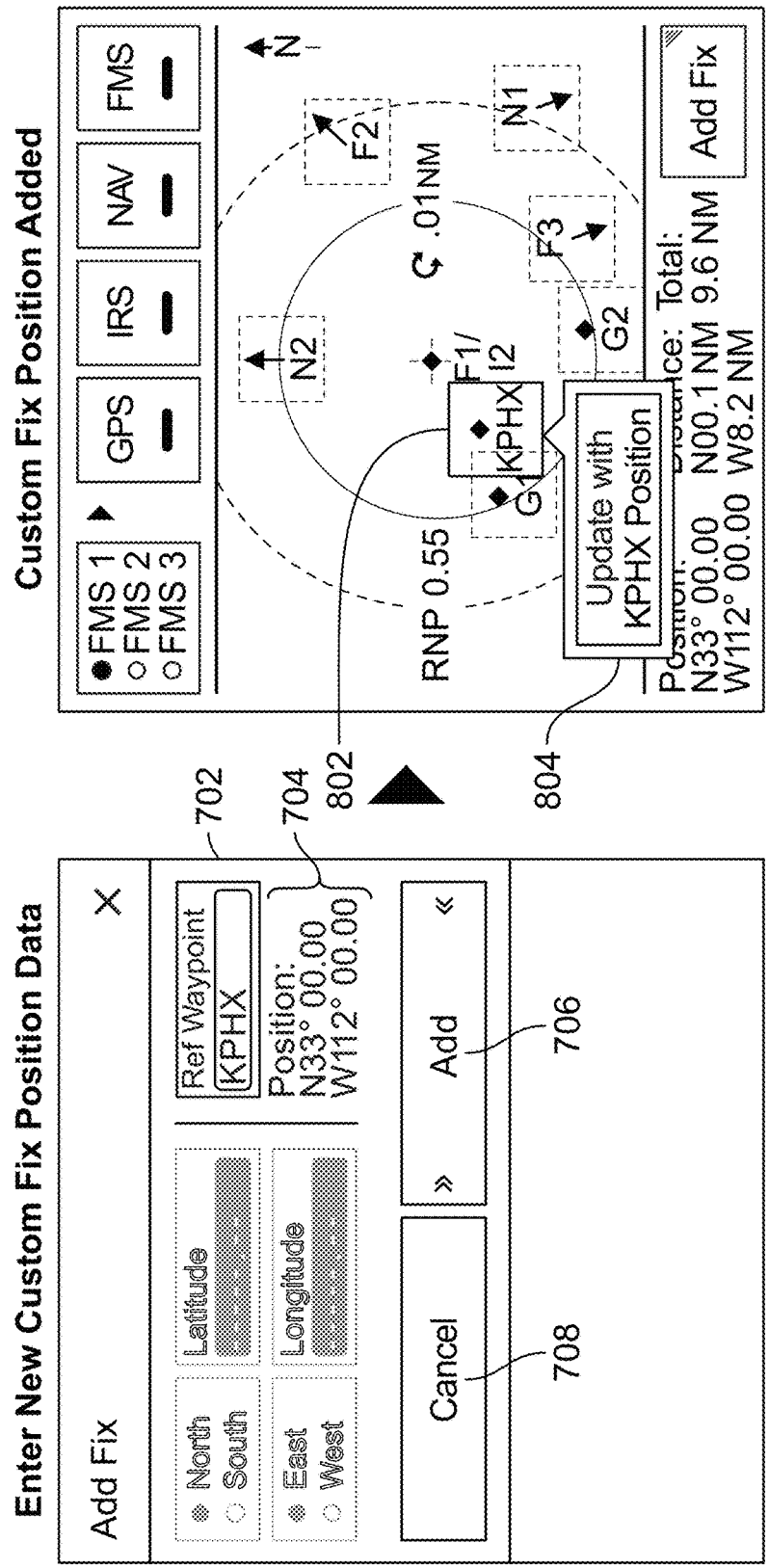

Using FIG. 3 as the starting point, we move to FIG. 4. In FIG. 4, a user wishes to update the FMS 1 with the position of the IRS sensor (324). In FIGS. 4, 324 and 318 are near each other on the displayed area, so when the user touches the screen, the human-machine interface provided by the system 102 will prompt the user with visual feedback in the form of a text box 402 having both "update with IRS position" 404 and "update with F2 position" 406 text. The user is prompted by these options to slide a finger to select one of the options. In this example, the user slides the finger to highlight the "update with IRS position" text, upon detecting the selection (the processes of the user input interpretation module 204, including the presence/absence and duration of continuous touch requirements are confirmed), resulting in additional visual feedback on the human-machine interface: the position of the selected sensor is displayed 408, and the distance to the selected sensor position is displayed 410. The system 102 determines that selection is complete when, after meeting the selection requirements, the user ceases touching the selected item. When selection is complete, the processes of the calibration module 206 and layout modification module 208 are performed, and FIG. 5 depicts the F1/IRS update at the center of the range ring 306.

As mentioned, the user may wish to add a fix, and can use the "add fix" button 328 for this function. In FIG. 6, a user-friendly text box 702 may open to prompt the user to enter the fix. In the example, the user has entered a waypoint KPHX at 702 and the system 102 automatically displays the position of the added fix at 704. Once the new fix has been added, the user can add (706) or cancel (708) the fix with selectable boxes on the interface. Once the user has added the fix, the system 102 updates the interface layout to depict the position of the fix. The user may choose to update the position computer with the newly added fix by selecting it the same way as described above: touching the user interface at the KPHX 802 location, and holding the touch continuously to meet a threshold requirement, until an option for "update with KPHX position" is displayed on the interface. When the finger slides over the "update with KPHX position," and releases, the system 102 determines that it has been selected and performs the update operation as before. FIG. 9 shows this update (902), note that the distance is updated to 9.6 nautical miles (904).

Figures 11, 12:
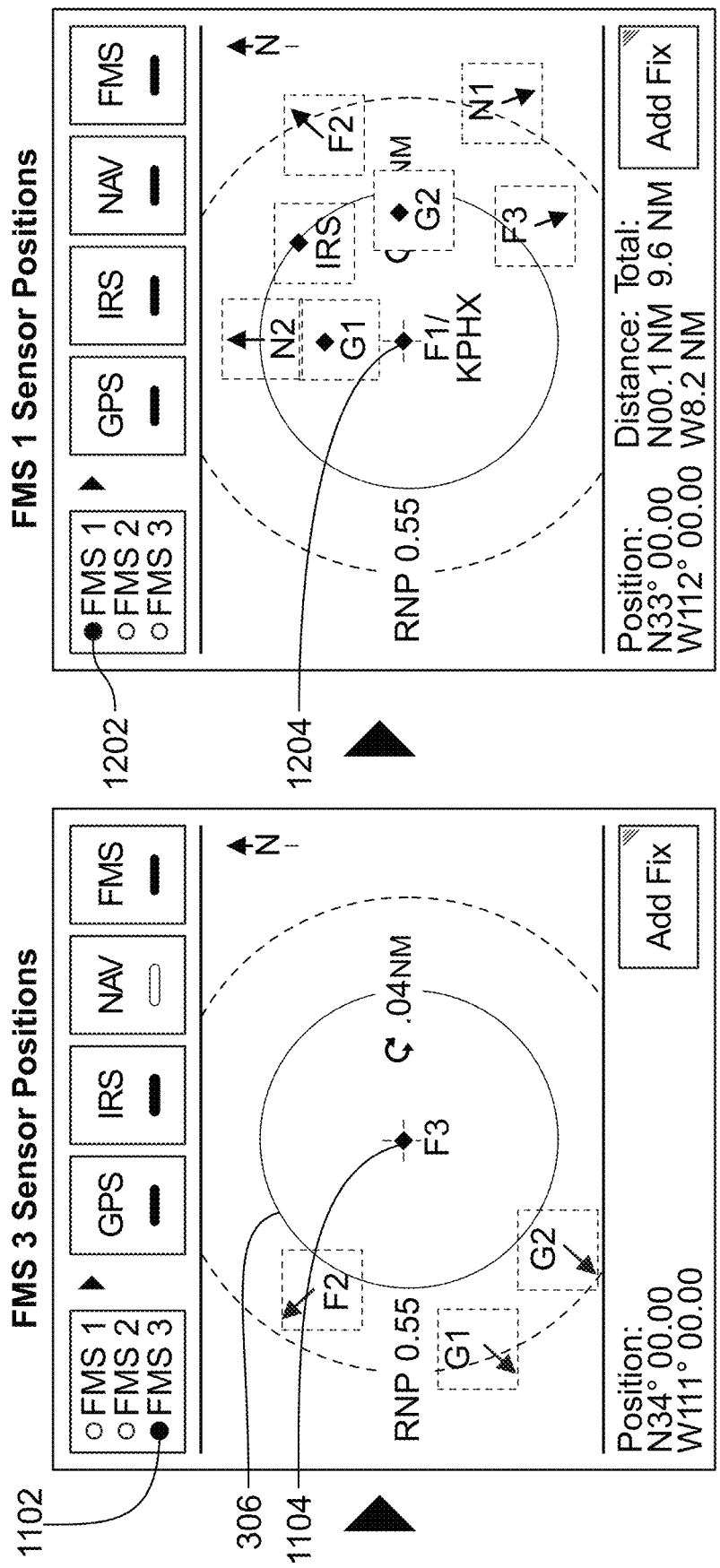

FIG. 10 provides an illustration of selecting the second position computer, or FMS 2 (1002). As a result of this selection, the user interface layout 203 has been modified to place the blended F2 in the center of the range ring 306, and the remaining available sensor positions are depicted with respect to F2 (1004). FIG. 11 provides an illustration of selecting the third position computer, or FMS 3 (1102). As a result of this selection, the user interface layout 203 has been modified to place the blended F3 in the center of the range ring 306, and the remaining available sensor positions are depicted with respect to F3 (1004). FIG. 12 is included in this example to show that when a user selects FMS 1 again (1202), after the sequence illustrated by FIGS. 3-11, the blended sensor position F1/KPHX (1204) is displayed, because that reflects the most recent user modification to FMS 1. Had the user modified FMS2 and/or FMS 3, upon selecting them again, the most recent update would show there as well.

As mentioned above, in some embodiments, the system 102 may indicate the position of each sensor by a symbol that is associated with the navigation category of the sensor. In FIG. 13, the ownship aircraft 100 is shown in the center of a couple of concentric range rings in a lateral display area. An antenna symbol 1302, a gyroscope symbol 1304, and a satellite symbol 1306 is depicted.

In another mentioned embodiment, terrain data may be received, and a terrain layer may be rendered in the background of the user interface layout 203 rendered on the touch-enabled display unit. By adding the terrain map layer to the user interface layout 203 on the avionics display 112, the use is objectively assisted in correlating an onboard sensor position with geographical features such as lakes, curvature of shore, mountains and curvature of the terrain, cities, rivers, and the like. By providing this terrain map layer, it is much easier and more intuitive for the crew to correctly pick or exclude onboard sensors from being considered in blended or voted position sensor calibration computations.

While not depicted in FIG. 14, it is to be appreciated that the selection band 302 along the top, and the band along the bottom 350 for additional text and graphical objects is present along with the lateral display areas depicted in FIGS. 13 and 14.

Figure 15:
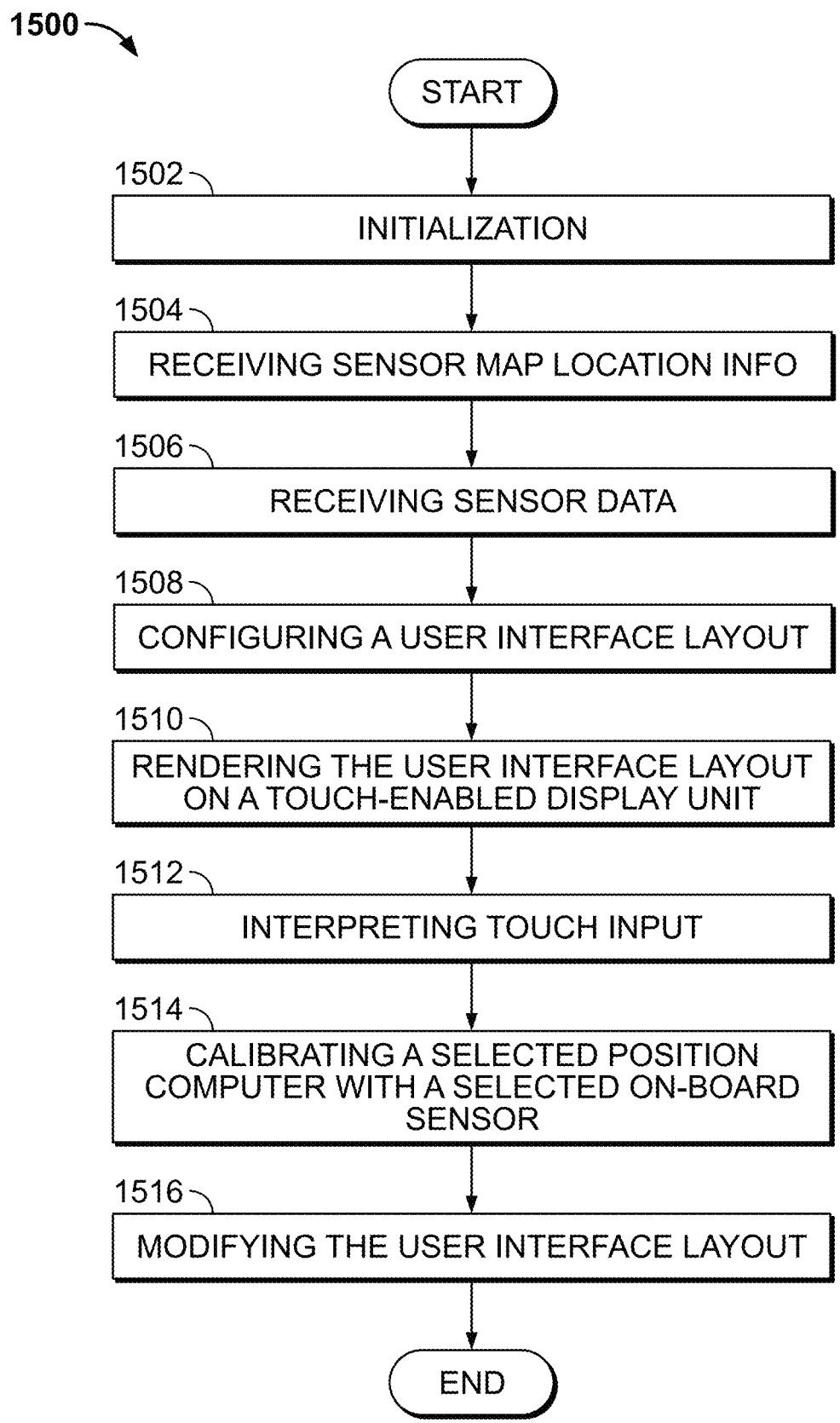
FIG. 15 is a flow chart of a method for calibrating an aircraft position by providing touch-enabled selection of onboard sensors on an aircraft, as may be implemented by the system of FIG. 1, in accordance with an exemplary embodiment of the present disclosure.

Turning now to FIG. 15, the system 102 described above may be implemented by a processor-executable method 1500 for computing an aircraft position by providing touch-enabled selection of onboard sensors (118, 120, 122, 124) may be utilized onboard a mobile platform 100 to provide an aircraft position (shortened herein to method 1500). For illustrative purposes, the following description of method 1500 may refer to elements mentioned above in connection with FIGS. 1-2. In practice, portions of method 1500 may be performed by different components of the described system. It should be appreciated that method 1500 may include any number of additional or alternative tasks, the tasks shown in FIG. 15 need not be performed in the illustrated order, and method 1500 may be incorporated into a more comprehensive procedure or method having additional functionality not described in detail herein. Moreover, one or more of the tasks shown in FIG. 15 could be omitted from an embodiment of the method 1500 as long as the intended overall functionality remains intact.

At 1502, the system 102 is initialized. Initialization may include loading instructions and program 134 into a processor within the controller circuit 104, as well as, depending on the embodiment, loading map data, aircraft-specific features, and a symbol library into one or more database(s) 50. At 1504 the sensor map location information for the aircraft is received. At 1506, the sensor data is received for the onboard sensors used for navigation. At 1508, the user interface layout is configured. At 1510, the user interface layout 203 is rendered on a touch enabled display device. At 1512, the method performs touch interpretation and provides related visual feedback. At 1514 the selected position computer is calibrated with a selected onboard sensor, and at 1516 the user interface layout 203 is modified accordingly. After 1516, the method may end or return to 1506.

Thus, enhanced systems and methods for calibrating an aircraft position by providing touch-enabled selection of onboard sensors on an aircraft having a touch-enabled display unit. The provided methods and systems provide an objectively improved human-machine interface with map views, intuitive symbols for onboard sensors, and notifications that provide relevant and time-critical information. The provided enhanced features do not require the pilot to refer back and forth between screens or do any mental distance or location calculations.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A system for calibrating aircraft position by providing touch-enabled selection of onboard sensors on an aircraft having a touch-enabled display unit, the system comprising:
   a number N of position computers, N being greater than or equal to 1;
   a plurality of onboard sensors for providing respective sensor data, the onboard sensors including a global position system (GPS) sensor, an inertial reference system (IRS) sensor, a radio navigation (NAV) sensor, and, for each of the N Position computers, a respective FMS sensor;
   a controller circuit comprising a processor configured to execute programming instructions stored in a memory, that when executed by the processor cause the controller circuit to:
   receive sensor map location information for the onboard sensors;
   receive sensor data from the onboard sensors;
   configure a user interface layout for the touch-enabled display unit based on the sensor map location information and the sensor data, the user interface layout presenting the N Position computers, the GPS sensor, the IRS sensor, the NAV sensor, and the N FMS sensors, using symbols at respective locations;
   render the user interface layout on the touch-enabled display unit;
   interpret a touch input from the touch-enabled display unit to select a Position computer and to select an onboard sensor;
   calibrate the selected Position computer with the selected onboard sensor responsive to the touch input;
   modify the user interface layout to reflect the calibration; and
   modify a displayed range ring on the user interface layout responsive to the calibration.

2. The system of claim 1, wherein to interpret the touch input includes detecting a continuous touch of at least a first duration of time at an indicator of the onboard sensor on the user input interface.

3. The system of claim 2, wherein to interpret the touch input the controller circuit is further configured to:
   display an alphanumeric message to update the selected Position computer with the onboard sensor upon detection of the touch input; and
   determine that the onboard sensor has been selected upon (i) an expiration of the first duration of time with continuous touch, and (ii) followed by the touch input ceasing.

4. The system of claim 1, wherein the GPS sensor is a first GPS sensor, and further comprising a second GPS sensor.

5. The system of claim 1, wherein the IRS sensor is a first IRS sensor, and further comprising a second IRS sensor.

6. The system of claim 1, wherein the NAV sensor is a first NAV sensor, and further comprising a second NAV sensor.

7. The system of claim 1, wherein the user interface layout includes:
   a dedicated area;
   and wherein the controller circuit is further configured to:
   indicate a blended FMS sensor associated with the selected Position computer at a center of the dedicated area; and
   indicate, in the dedicated area, a location of each of the onboard sensors by rendering a respective alphanumeric label and a symbol.

8. The system of claim 1, wherein the controller circuit is further configured to use a first symbol to indicate each global position system (GPS) sensor, a second symbol to represent each inertial reference system (IRS) sensor, a third symbol to indicate each navigation (NAV) sensor, and a fourth symbol for each FMS sensor, and wherein the first, second, third and fourth symbols are visually distinguishable from each other.

9. The system of claim 8, wherein the first symbol, second symbol, third symbol, and fourth symbol include an antenna, a satellite, and a gyroscope.

10. The system of claim 1, wherein the controller circuit is further configured to:

receive terrain data; and
   render a terrain layer in a background of the user interface layout rendered on the touch-enabled display unit.

11. A processor-implemented method for calibrating an aircraft position on an aircraft having a touch-enabled display unit, the method comprising:
   receiving sensor map location information for onboard sensors, the onboard sensors including N flight management system (FMS) computers, a geospatial positioning system (GPS) sensor, an instrument radar system (IRS) sensor, a navigation (NAV) sensor, and N FMS sensors;
   receiving sensor data from the onboard sensors;
   configuring a user interface layout for the touch-enabled display unit based on the sensor map location information and the sensor data, the user interface layout presenting the N Position computers, the GPS sensor, the IRS sensor, the NAV sensor, and the N FMS sensors, using symbols at respective locations;
   rendering the user interface layout on the touch-enabled display unit;
   interpreting a touch input from the touch-enabled display unit to select a Position computer and to select an onboard sensor;
   calibrating the selected Position computer with the selected onboard sensor responsive to the touch input;
   modifying the user interface layout to reflect the calibration; and
   modifying a displayed range ring on the user interface layout responsive to the calibration.

12. The method of claim 11, further comprising:
   using a first symbol to indicate each global position system (GPS) sensor, a second symbol to represent each inertial reference system (IRS) sensor, a third symbol to indicate each navigation (NAV) sensor, and a fourth symbol for each FMS sensor; and
   wherein the first, second, third and fourth symbols are visually distinguishable from each other.

13. The method of claim 12, wherein the first symbol, second symbol, third symbol, and fourth symbol include an antenna, a satellite, and a gyroscope.

14. The method of claim 13, further comprising:
   receiving terrain data; and
   rendering a terrain layer in a background of the user interface layout on the touch-enabled display unit.

15. The method of claim 14, further comprising:
   detecting a continuous touch of at least a first duration of time at an indicator of the onboard sensor on the user input interface.

16. The method of claim 15, further comprising:
   displaying an alphanumeric message to update the selected Position computer with the onboard sensor upon detection of the touch input; and
   determining that the onboard sensor has been selected upon (i) an expiration of the first duration of time with continuous touch, and (ii) followed by the touch input ceasing.

17. A system for calibrating an aircraft position, comprising:
   a controller circuit, the controller circuit configured to:
      receive ownship data from ownship data sources including sensor data from a plurality of onboard sensors, the onboard sensors including a global position system (GPS) sensor, an inertial reference system (IRS) sensor, and, a radio navigation (NAV) sensor, and reference sensor map location information for the onboard sensors to generate therefrom a user interface layout for a touch-enabled display;
      process user input at the touch-enabled display with respect to the user interface layout to:
         determine when a user has selected a Position computer;
         determine when the user has selected an onboard sensor;
      calibrate the selected Position computer with the selected onboard sensor;
      determine which aspects of the user interface layout to modify; and
      modify (i) the user interface and (ii) a displayed range ring on the user interface layout accordingly, responsive to the calibration of the Position computer with the selected onboard sensor.

18. The system of claim 17, wherein the controller circuit is further configured to:
   detect a continuous touch of at least a first duration of time at an indicator of the selected onboard sensor on the user interface layout;
   display an alphanumeric message to update the selected Position computer with the onboard sensor upon detection of the touch input; and
   determine that the onboard sensor has been selected upon (i) an expiration of the first duration of time with continuous touch, and (ii) followed by the touch ceasing.

19. The system of claim 18, wherein the controller circuit is further configured to:
   detect that an add fix button has been touch selected;
   receive alphanumeric input at a designated area for a fix; and
   determine when the user has selected the fix to correlate with the selected Position computer.

20. The system of claim 19, wherein controller circuit is further configured to:
   receive terrain data; and
   render a terrain layer in a background of the user interface layout rendered on the touch-enabled display unit.

* * * * *